No. 50,799.  PATENTED NOV. 7, 1865.
G. CRANDELL.
DOUBLE LEVER FISH HOOK.
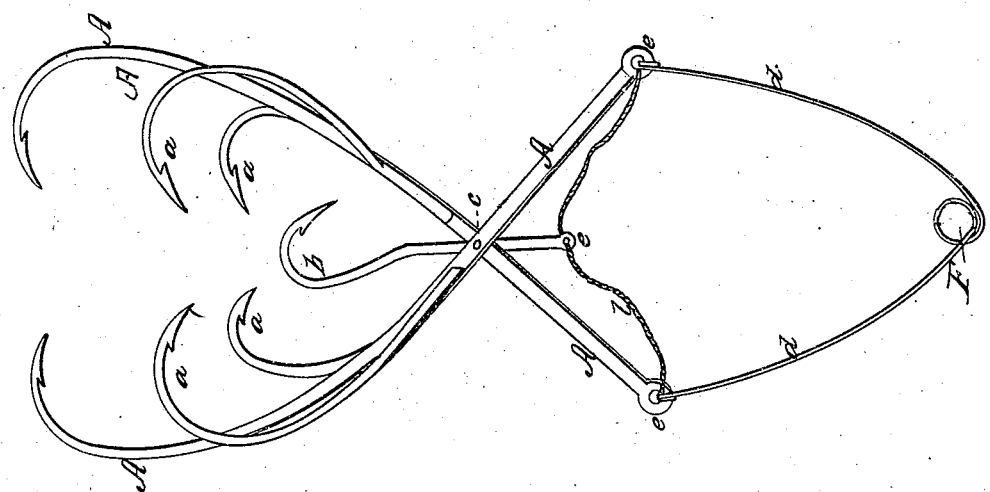
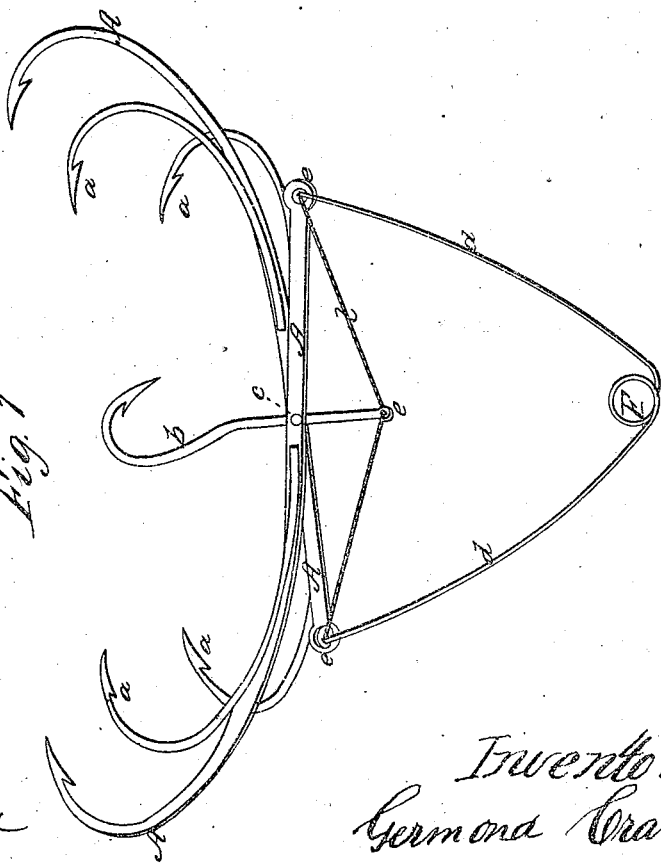
Witnesses:
J. W. Phillips
Geo. C. Lambright
Inventor:
Germond Crandell

UNITED STATES PATENT OFFICE.

GERMOND CRANDELL, OF WASHINGTON, DISTRICT OF COLUMBIA.

IMPROVEMENT IN DOUBLE-LEVER FISH-HOOKS.

Specification forming part of Letters Patent No. 50,799, dated November 7, 1865.

*To all whom it may concern:*

Be it known that I, GERMOND CRANDELL, of Washington, in the county of Washington, in the District of Columbia, have invented a new and Improved Combination Lever Fish-Hook; and I do hereby declare that the following is a full and exact description thereof, reference being had to the accompanying drawings, and to the letters of reference marked thereon.

The nature of my invention consists in constructing and so arranging a hook for the catching of fish that the seizing of the bait-hook by the fish and the drawing of the fisherman upon his line brings the fish between two sections of the hook, each supplied with barbed points, pressing him on both sides at the same time, upon the principle of a double lever, his own weight being the power, thus rendering his escape impossible.

To enable others skilled in the art to make and use my invention, I will proceed to describe its construction and operation.

I construct three hooks, A A and $b$, of the proper size and shape, and join them at $c$, as shown by Figure 1.

$e\ e\ e$ are eyes in the upper ends of the hooks A A and $b$, to each of which is fastened the small line $l$, which keeps the hook $b$ in its proper place when the hooks A A are open.

$d$ is a steel wire of the proper size fastened to the hooks A A at $e$ and bent, as shown in the figure, constituting a spring to keep the large hooks open, and also a point of connection, F, with the main line.

This represents the hook in its simplest form; but in the figure additional hooks or points $a\ a$ are shown firmly fastened to each side of the large hooks A A, which may be increased to any desirable number, so as to prevent the smallest fish from escaping. These hooks, thus added, may be barbed or not, according to taste, and even the large hooks the same, although it may be safer to have the barbs.

The bait is put upon the hook $b$, which is called the "bait-hook," and may be fastened there and used for a long time, as the fish have not the facilities for escaping with the bait as with ordinary hooks.

The hook adjusts itself by means of the spring $d$, and is represented properly adjusted in Fig. 1. Fig. 2 represents the hook partly closed, showing its condition after the fish has pulled upon the bait-hook.

Different forms may be used in the arrangement and construction of the claw-hooks, such as having another set of hooks placed at right angles with the hooks A A, and joined at the point $e$, the upper end of the bait-hook, all moved at the same time and by the same means as the two, thus covering the fish on four sides.

The main line may be attached to the large hooks A A at $e\ e$ also, instead of at F, when it is desired to make the hook more secure.

The hooks A $a$ are in form similar to a common fish-hook, but this form is not necessary. For the bait-hook any suitably-bent holder may be substituted. The levers which operate the catching-hooks A A can be arranged so as to give a larger or smaller opening for the entrance of the fish between the hooks.

Having thus described my invention, what I claim, and desire to secure by Letters Patent of the United States, is—

The lever-hooks A A, either with or without the side hooks, $a\ a$, in combination with the bait-holder $b$ and the spring $d$, the whole arranged to operate substantially as and for the purposes herein set forth.

GERMOND CRANDELL.

Attest:
 J. H. PHILLIPS,
 GEO. C. LAMBRIGHT.